(12) United States Patent
Seck et al.

(10) Patent No.: US 11,762,962 B2
(45) Date of Patent: Sep. 19, 2023

(54) ONBOARDING OF MONITORING TOOLS

(71) Applicant: Capital One Services, LLC, McLean, VA (US)

(72) Inventors: Mohamed Seck, Aubrey, TX (US); Louis Buell, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 154 days.

(21) Appl. No.: 17/362,403

(22) Filed: Jun. 29, 2021

(65) Prior Publication Data

US 2022/0414187 A1 Dec. 29, 2022

(51) Int. Cl.
| | | |
|---|---|---|
| *G06F 21/10* | (2013.01) | |
| *G06F 9/54* | (2006.01) | |
| *G06F 11/34* | (2006.01) | |
| *G06F 21/12* | (2013.01) | |
| *G06F 3/0482* | (2013.01) | |
| *H04L 67/025* | (2022.01) | |
| *G06F 11/30* | (2006.01) | |

(Continued)

(52) U.S. Cl.
CPC .......... *G06F 21/105* (2013.01); *G06F 3/0482* (2013.01); *G06F 9/547* (2013.01); *G06F 11/3065* (2013.01); *G06F 11/3409* (2013.01); *G06F 11/3466* (2013.01); *G06F 21/121* (2013.01); *H04L 67/025* (2013.01); *G06F 11/008* (2013.01); *G06F 16/951* (2019.01); *G06F 2221/0766* (2013.01)

(58) Field of Classification Search
CPC ...... G06F 21/105; G06F 21/121; G06F 9/547; G06F 11/3409; G06F 11/34; G06F 11/3438; G06F 11/3452; G06F 11/008; G06F 11/3055; G06F 11/3065; G06F 11/3466; G06F 3/048; G06F 3/0481; G06F 3/0482; G06F 16/951; G06F 16/953; G06F 16/9532; G06F 16/9538; G06F 2201/865; G06F 2221/0766; G06F 2221/0757; H04L 67/025; H04L 67/01; H04L 67/02; H04L 67/125

See application file for complete search history.

(56) References Cited

U.S. PATENT DOCUMENTS 10,073,837 B2 9/2018 Setayesh et al.
10,394,802 B1 8/2019 Porath et al.
(Continued)

OTHER PUBLICATIONS

Nov. 24, 2022—(EP) Extended European Search Report—U.S. Appl. No. 22/181,769.

*Primary Examiner* — Andrew L Tank
(74) *Attorney, Agent, or Firm* — Banner & Witcoff, Ltd.

(57) ABSTRACT

A system, process, and computer-readable medium for configuring agents for monitoring deployed applications is described. A system, process, and computer-readable medium for configuring monitoring user interfaces, e.g., monitoring dashboards, that use information made available from the agents is also described. Through using application data available during creation of the agents, the agents may be configured using the user interface as modified by selections and displaying subsequent choices from the received application data. Using knowledge of the generated agents, monitoring dashboards may be generated via developers interacting with a user interface providing a list of available metrics accessible by the generated agents. Using the one or more user interfaces, developers may generate agents and/or monitoring dashboards with greater efficiency.

20 Claims, 8 Drawing Sheets

(51) Int. Cl.
  *G06F 11/00*  (2006.01)
  *G06F 16/951*  (2019.01)

(56) References Cited

U.S. PATENT DOCUMENTS

| | | |
|---|---|---|
| 10,467,633 B2 | 11/2019 | Hsu et al. |
| 10,509,794 B2 | 12/2019 | Filippi et al. |
| 2010/0280962 A1 | 11/2010 | Chan |
| 2011/0126111 A1 | 5/2011 | Gill et al. |
| 2017/0286449 A1 | 10/2017 | Strube et al. |
| 2018/0082232 A1 | 3/2018 | Howard et al. |
| 2018/0089288 A1 | 3/2018 | Haggie et al. |
| 2018/0189344 A1 | 7/2018 | Akwule et al. |
| 2019/0190803 A1 | 6/2019 | Joshi et al. |
| 2020/0118030 A1 | 4/2020 | Sainani et al. |
| 2020/0320212 A1 | 10/2020 | Kaminski et al. |
| 2020/0387550 A1 | 12/2020 | Cappetta et al. |
| 2020/0409825 A1 | 12/2020 | Balasubramanian et al. |

ONBOARDING OF MONITORING TOOLS

FIELD OF USE

Aspects of the disclosure relate generally to monitoring of networked devices.

BACKGROUND

Network services form the backbone of on-line interactions. Those network services and the servers, databases or other storage or memory, and hardware/software interfaces, at times, need maintenance to address issues. To eliminate interruptions caused by taking network services offline, service providers may segregate their services into production environments and non-production environments. The production environment may provide actual services while the non-production environment may be used to test new packages including software, network interactions, and/or network pathways before moving those packages to the production environment. Developers may use dashboards to monitor individual applications. Setting up the monitoring dashboards may be tedious as individual applications may exist in various forms across the production/non-production environments, have been written in a different software language and/or version of that software language, are isolated from other environments, require multiple unique license keys, and/or require detailed configuration. Those differences may require significant developer time to appropriately configure any given dashboard to monitor a specific application. Based on the complexity of establishing a single monitoring dashboard, attempting to establish multiple monitoring dashboards that span multiple applications may take weeks or months' worth of time to appropriately configure the dashboards.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address these and other problems, and generally improve how applications may be monitored via dashboards. In additional aspects, based on the improvements in the speed to begin monitoring applications, customers using services provided by those applications may have better user experiences with those services. The improved services may be at least based on the developers being able to start monitoring applications more readily, thereby permitting moving applications from non-production environments to production environments. Further, issues, whether transient and/or recurring, in the monitored applications may be able to be addressed more readily by reducing developers' workload for configuring the monitoring of each application and permitting the found time to be used in the actual monitoring and improving of the deployed applications. One or more aspects are directed to improving how applications are monitored. Other aspects may comprise improving how monitoring dashboards are implemented. By efficiently establishing monitoring environments and/or displays to be used in the monitoring of deployed applications, delays caused by issues associated with inadequately monitored applications may be avoided and, thus, improve overall experiences for the companies' customers.

According to some aspects, these and other benefits may be achieved by using a computer-implemented method that may comprise receiving a dataset for deployed applications, wherein the dataset comprises application identifiers, production environment identifiers, and license keys, wherein the license keys are associated with combinations of the application identifiers and production environment identifiers. The method may further comprise generating a first user interface comprising a plurality of regions. The regions may comprise a first region configured to receive an application name associated with a deployed application of the deployed applications, a second region configured to receive a selection of production environment identifiers, a third region configured to receive a selection of license keys, and a fourth region configured to receive a language identification of a computer-readable language in which the deployed application was written. The method may further comprise receiving, via the first region, the application name; determining, from the dataset, an application identifier from the application identifiers corresponding to the application name; based on the application identifier, determining application identifier-specific production environment identifiers and application identifier-specific license keys associated with respective application identifier-specific production environment identifiers; modifying the first user interface to provide a list, in the second region, of the determined application identifier-specific production environment identifiers and to provide a list, in the third region, of the determined application identifier-specific license keys; and receiving, via the modified first user interface, a selected environment identifier via the second region, a selected license key via the third region, and the language identification via the fourth region. Based on the application identifier, the selected environment identifier, the selected license key, and the language identification, generating a software agent configured to facilitate monitoring the deployed application, wherein the software agent is configured to expose operations of the deployed application to be addressable, via an application programming interface (API), as metrics. The method may further comprise generating, based on the generated software agent and the metrics made available via the generated software agent, a second user interface comprising a sixth region configured to receive the application identifier and a seventh region configured to receive a selection of the metrics; and based on the application identifier received in the sixth region and the selection of one or more of the metrics, cause a monitoring application to monitor the selected metrics via the API.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
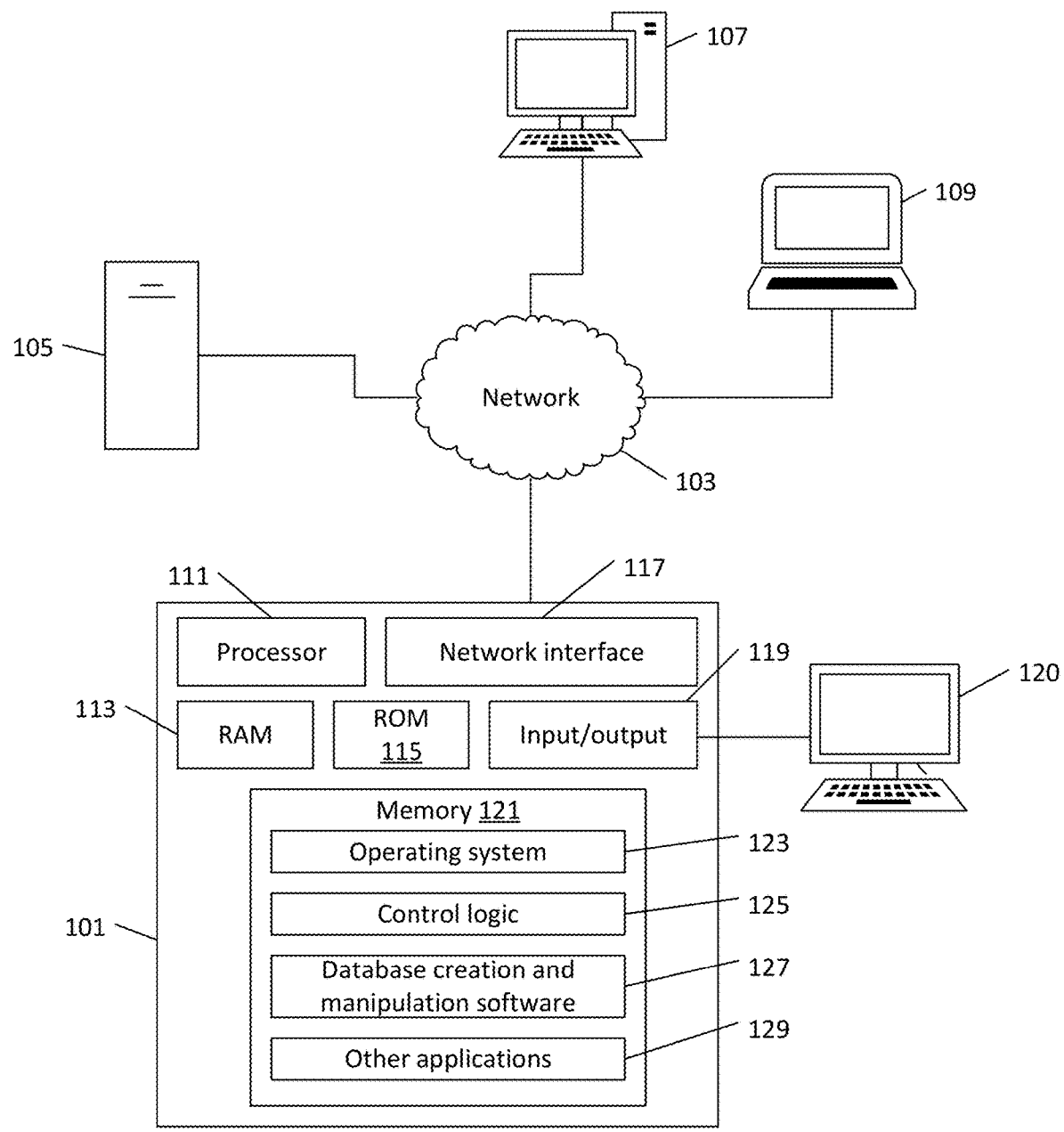
FIG. 1 depicts an example of a computing device and system architecture that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations.

By way of introduction, aspects discussed herein may relate to methods and techniques for monitoring applications. One or more of those aspects may include creating monitoring tool dashboards for monitoring deployed applications while accounting for the nuances of requirements to permit the monitoring of each application.

Aspects of the concept pertain to creating monitoring tool dashboards for monitoring deployed applications. Developers need to test and subsequently monitor deployed applications in active environments. While dashboards are useful, setting up monitoring dashboards is tedious and error-prone as each deployed application is different. For example, to enable a dashboard to subscribe to a data stream of an application, for instance, via an application programming interface (API) handle, the developer is required to research, for each application, that application's unique API handles and connect those handles to a monitoring dashboard. In some instances, multiple levels of authentication are required to be able to access the APIs, thus complicating the level of research required to implement a single monitoring dashboard. One or more aspects address the difficulty of creating monitoring dashboards by segmenting the creation of dashboards into creating a specific agent for the deployed application and creating a dashboard based on information made available by the application-specific agent. A process for creating the agent may include a user interface that provides a developer with possible options associated with different fields for the agent, where the options may be filtered based on based on previous selections in the user interface.

A use-case is provided as follows. An application is deployed into a specific environment. That environment may be a production environment, a non-production environment, or other environment. A developer may provide initial information for an agent for monitoring that application including the name of the application and the production environment. From that information, information for that application may be obtained and used to populate a user interface for the developer to select among various options to further configure that agent. The various options may include, but are not limited to, license keys, production/non-production options, and/or other information specific for that application and/or environment. The agent may be generated based on the supplied information and installed in the application's environment. Next, a monitoring dashboard may be generated based on information known about the agent. For instance, the developer may identify, via a user interface for generating the monitoring dashboard, the name of the agent and/or the name of the application. From that information, the user interface for generating the dashboard may be updated with available items from that agent including, for instance, transaction-related metrics and/or browser related metrics. Based on the developer's selections of the one or more of the available metrics, the monitoring dashboard may be created by identifying the one or more data fields exposed via the agent for the subject application and generating one or more status regions, based on the selected metrics, that use information from the data exposed by the agent. By leveraging the translation capability of the agents, dashboards may be easily created as the agents are providing data using handles known at the time of creating the agent. In other words, the agent is providing standardized and/or previously identified fields. This is in contrast to attempting to learn the nuances of each application's API and authentication requirements. Using the agents reduces the developer's need to obtain in-depth knowledge of each application before being able to access the application's data and reduces the developer's need to obtain in-depth knowledge of each monitoring tool before being able to generate monitoring dashboards for the application or applications. Additional implementations include generating an agent to monitor information other than performance of a deployed application. For example, an additional implementation may include creating an accounting agent to monitor accounting information (e.g., ledger information) passing through a system and providing information flowing past that agent. Another implementation may include creating a financial agent to monitor a financial state of an organization. Yet another implementation may include creating a medical agent to monitor changes in the health records of a patient or patients, e.g., monitoring pharmaceutical prescriptions, relationships between physicians and patients, status of medical tests (performed and yet to be performed) and their results, and the like. A further implementation may include creating a credit monitoring agent to monitor a person's credit and/or multiple persons' credit and how the credit positions change over time. Other agents may be created and deployed as desired to monitor other data.

Some of the advantages described herein include simplifying a dashboard generation process by removing the opportunity for errors entering improper information by confining selectable options to predefined selectable choices. Also, because the agents act as intermediaries between the applications and the dashboards, errors in creating the dashboards may be reduced as the dashboards are accessing known agents compared to unknown applications. Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python or JavaScript. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for verifying an authentication capability for a service.

Figure 2:
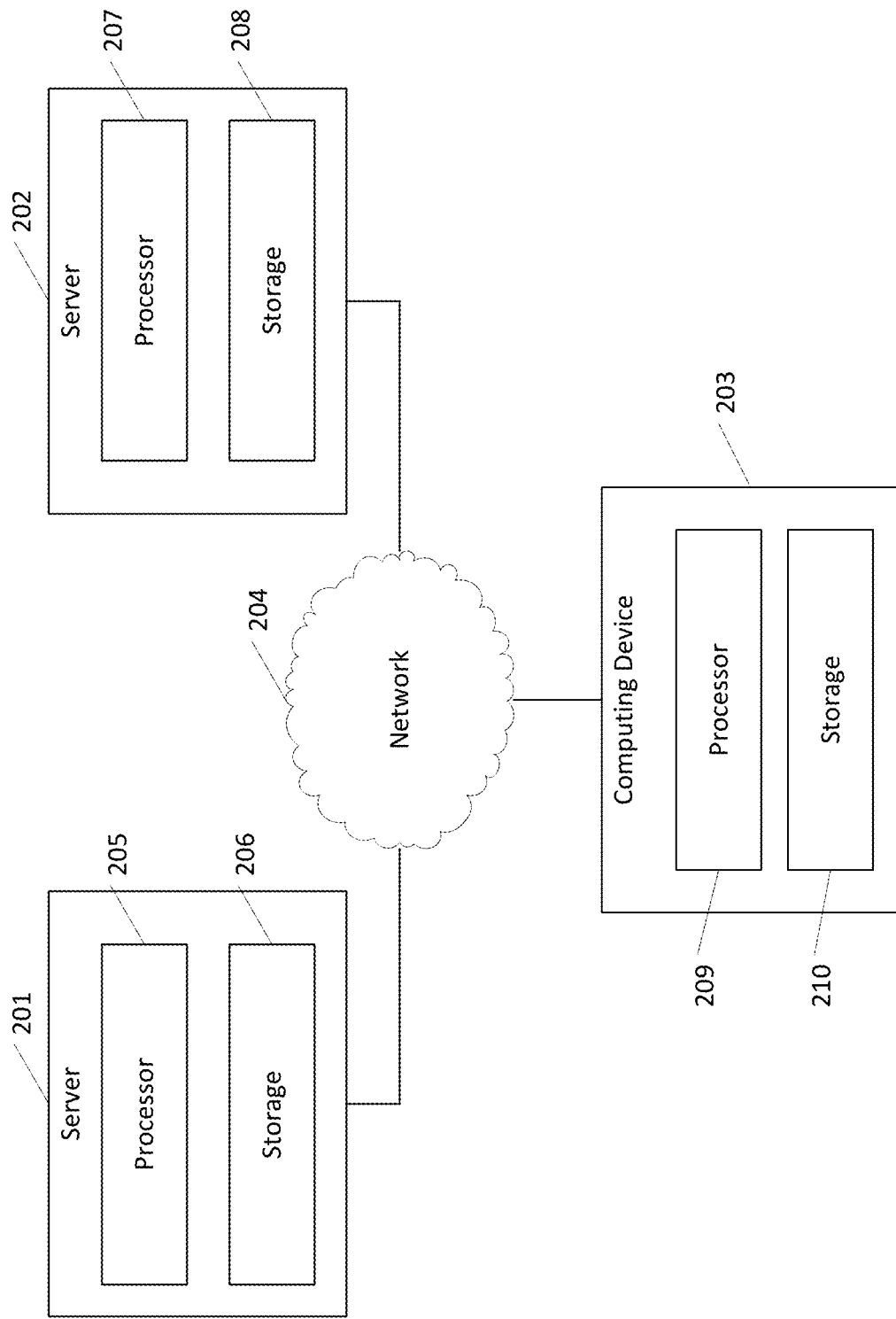
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected by a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally, or alternatively, a set of devices (e.g., one or more devices) of the environment 203 may perform one or more functions described as being performed by another set of devices of the environment. Network 204 may be represented as a single network but may comprise combinations of other networks or subnetworks. In one or more examples, agents may be configured on a computing device 203 using information from server 201 regarding one or more applications executing on server 202. Those agents may be installed in the computing environment of server 202 and provide access to data relating to those applications. Using data, from the agents installed in the computing environment of server 202, developers may generate monitoring dashboards for display on user interfaces, for instance, controlled by computing device 203. Additionally or alternatively, the agents may not be installed in the environments of the applications but instead execute separately and, for instance, send API calls to the applications and receive the applications' data streams in response to the API calls.

A process of configuring agents to monitor applications and a process of configuring a monitoring environment to use data exposed by the agents to monitor applications are described herein. For purposes of explanation, the process is described in the following sections: Configuring Agents to Expose Application Data and Configuring Monitoring Environments using Agents.

Configuring Agents to Expose Application Data

Figure 3:
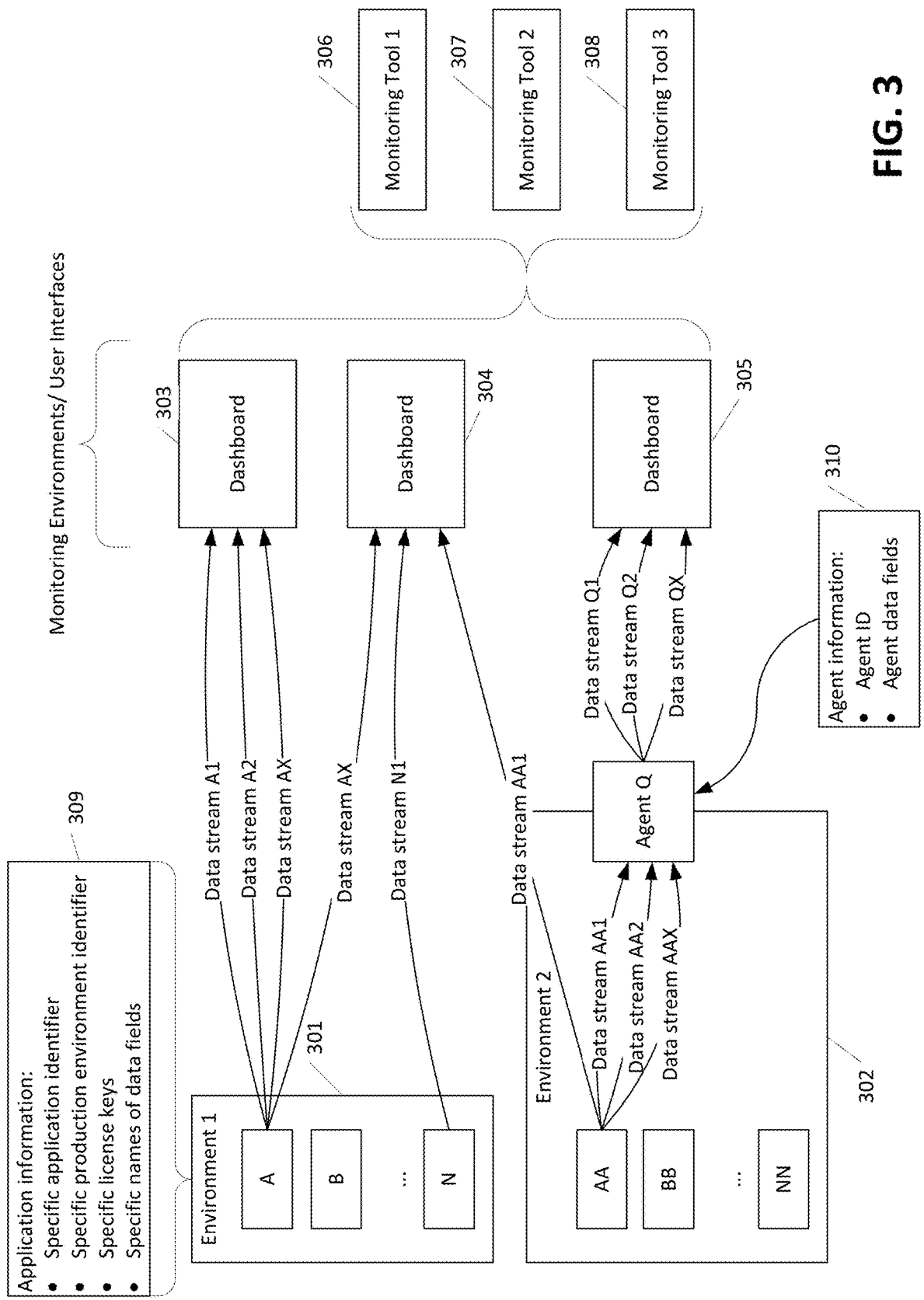
FIG. 3 depicts a block diagram of monitoring dashboards configured to monitor applications in different environments.

FIG. 3 depicts a block diagram of monitoring dashboards configured to monitor applications in different environments. FIG. 3 includes environment 1 301 having applications A, B, through N and environment 2 302 having applications AA, BB through NN. FIG. 3 includes a plurality of monitoring environments and/or user interfaces that may include one or more monitoring dashboards 303-305. The monitoring dashboards 303-305 may have been created using one or more monitoring tools 1-3 306-308. In a first example of a monitoring dashboard, dashboard 303 is configured to receive data streams A1, A2, and AX from application A in environment 1 301. For a developer to create dashboard 303, the developer needs to know specific information regarding application A as well as information about environment 1 301. That specific information may include one or more of the items identified as application information 309 including a specific application identifier, a specific production environment identifier, a specific license key or keys, and specific names of data fields. It is appreciated that additional items or fewer items in application information 309 may be required to obtain information from application A in environment 1 301. In a typical example, a given application may require 18 or more different license keys based on a team's cloud accounts, production/non-production environments, and language combinations (e.g., JAVA, Go, Ruby, Python, Node.js) of possible agents. Further, hours may be spent learning each monitoring tool 306-308 and the quantity of monitoring tools to learn, in a given monitoring environment, may be seven or more.

In another example, a dashboard 304 is configured to receive data streams A1, A2, and AX from application A and data stream N1 from application N in environment 1 301 and data stream AA1 from application AA in environment 2 302. Similar to the creation of dashboard 303, a developer needs to know specific information regarding application A, application N, and application AA that may include the items identified as application information 309 including a specific application identifier, a specific production environment identifier, specific license key or keys, and specific names of data fields. While the generation of dashboard 303 only required information relevant to application A and environment 1 301, the generation of dashboard 304 is increasingly complex as requiring, not only specific information regarding application A but also information regarding application N and information regarding application AA as well as specific information regarding each of environment 1 301 and environment 2 302.

FIG. 3 provides further example in which an agent Q 310 monitors application AA and provides information regarding the operation of application AA to a monitoring dashboard 305. As shown in FIG. 3, agent Q 310 is shown as installed in the environment 2 302. If installed in the environment 2 302, the agent Q 310 may directly monitor the operations of application AA. Being installed in the environment 2 302 may permit agent Q 310 to read data received by application AA and/or read data generated by application AA. Additionally or alternatively, agent Q 310 or another instance of agent Q 310 may reside separate from environment 2 302 (e.g., in a separate server). For instance, if residing separate from environment 2 302, the agent Q 310 may send application programming interface (API) calls to the application AA and, in response, receive one or more data streams relating to the operation of application AA.

Information from agent Q 310 may be provided to monitoring dashboard 305. To configure monitoring dashboard 305, using agent Q 310, a developer may need to know agent information 311 about agent Q 310 including an agent identification and agent data fields.

As shown in FIG. 3, the agent Q 310 receives data streams AA1, AA2, through AAX, from application AA of environment 2 302. Agent Q 310 wraps those data streams in its own identifiers and exposes the wrapped data streams to be accessed by monitoring dashboard 305 as data streams Q1, Q2, through QX. Alternatively or additionally, agent Q 310 may reformulate the incoming data streams into its own data streams. By using agent Q 310 as an intermediary, the developer is isolated from learning and re-learning the nuances of application AA and the nuances of environment 2 302. Rather, the developer is able to use the exposed interfaces of agent Q 310 to obtain relevant data streams from application AA.

Figure 4:
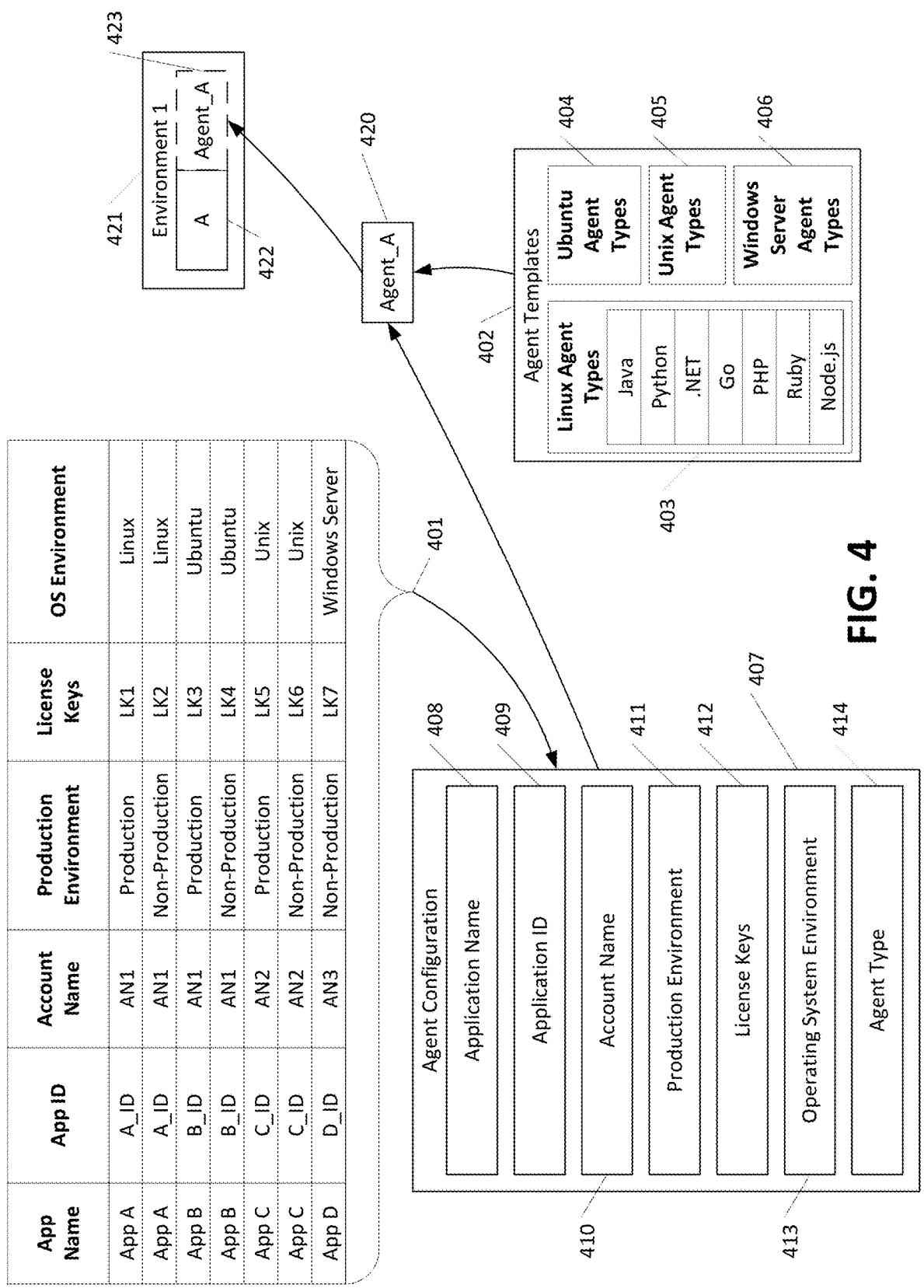
FIG. 4 depicts a user interface configured to receive selections for configuration of an agent.

FIG. 4 depicts a user interface configured to receive selections for configuration of an agent. To configure an agent to be installed in an environment (or otherwise interact with an application in that environment), a developer may be presented with a user interface populated with information regarding available applications and environments. As shown in FIG. 4, information regarding applications, environments, and related information may be provided as application data 401. Application data 401 may take the form of various computer readable information including one or more tables and/or one or more records stored in one or more databases to further the concepts as disclosed herein.

Application data 401, for example, may comprise rows and/or records identifying application names, application identifications associated with the application names, accounts associated with the applications, production environment information (e.g., production environments, non-production environments, and/or other environments), license keys associated with the applications in the accounts and the specific environments, and/or information describing operating systems in which the application executes. Additionally or alternatively, additional fields and/or fewer fields may be used in an implementation as described herein without detracting from the scope of the concepts.

Agent templates 402 may be provided in one or more computer readable information forms (e.g., one or more tables and/or one or more records in one or more databases). Agent templates 402 may comprise templates for the creation of agents for installation in environments to monitor applications and/or to remotely monitor those applications. As shown in FIG. 4, the agents are grouped into configurations of agents specific to an operating system of a particular environment in which an application exists. Alternatively or additionally, agent templates may be generic to operating system environments as the agents may run in virtual machines in the environments. For instance, the agent templates may be deployed in containers that run on virtual machines in each environment. For example, the agents may be provided in containers that may be "dockerized" (e.g., via dockerizing a Node.js application to be executable on various platforms in accordance with extensible services provided by Docker Inc. at www.docker.com).

Agent templates 402, as shown in FIG. 4, may support various operating system environments by separate agent types being created for each operating system. For instance, the agent types may comprise Linux agent types 403, Ubuntu agent types 404, UNIX agent types 405, Windows Server agent types 406, and/or other agent types. It is appreciated that additional agent types or fewer agent types may be made available based on the types of operating systems in the environments of the applications. The agent types 403-406 may comprise templates for agents in various programming languages, e.g., Java, Python, .NET, Go, PHP, Ruby, Node.js, and the like. It is appreciated that agents in additional or fewer programming languages may be made available as programming languages increase and decrease in popularity or familiarity. Further, types of each language may be included as well—e.g., for instance, for Linux, Amazon Web Service's version of Linux and Rhel's version of Linux may be included; for Ubuntu, Zenial's version of Ubuntu and other versions may be included.

FIG. 4 may include a user interface 407 that may comprise a variety of regions for accepting user input. The regions may comprise an application name region 408, an application ID region 409, an account name region 410, a production environment region 411, a license key or keys region 412, an operating system environment region 413, and an agent type region 414. One or more of the regions 408-414 may accept user input. Based on that input, a processor may compare that input with matching selections from application data 401 to obtain a filtered set of other options for display in the remaining user interface regions 408-414. For example, a developer may enter an application name in region 408. Based on that entry, a processor may retrieve data from application data 401 related the entered application name. The remaining user interface regions 409-414 may be populated with selectable content related to the retrieved fields from application data 401. The process may be repeated based on repeated selections of the selectable content from the various user interfaces 409-414. Additionally or alternatively, if there is only one option available for a region based on a previous selection, then the region may be populated with that sole value. For instance, if a developer enters "App A" for the application name in region 408, the application ID region 409 may be populated with the application ID "A_ID" corresponding to the matching application ID for the "App A" application name in application data 401. Additionally or alternatively, the user interface 407 may be configured to require two or more data fields to be entered prior to looking up the relevant information from application data 401.

In addition to providing information/selections in regions 408-413 that relate to information corresponding to data from application data 401, the developer may select, in region 414, a language in which an agent is to be written based on the available agent types in agent templates 402. For instance, if the operating system environment was "Unix", region 414 may be populated with the software languages associated with agent templates listed in the UNIX agent types 405 in the agent templates 402 dataset. Additionally or alternatively, the list of agent types in agent templates 402 may be simply the list of agent templates by software language (e.g., Java, Python, etc.) and not operating system-specific lists as shown in FIG. 4. Based on the information provided by and/or selected by a developer in regions 408-414 of the agent configuration user interface 407, a processor may use the information and the relevant agent template from agent templates 402 to generate agent_A 420. Next, agent_A 420 may be installed in environment 1 421 to monitor the operations of application A 422. For purposes of illustration, agent_A 420 is shown as agent_A 423 in broken lines in environment 1 421 and attached to application A 422.

The agent_A 420 may monitor the operations of application A 422 in a variety of ways. For instance, the agent_A 420 may actively compile information regarding the operation of application A 422. In response to an API request, the agent_A 420 may forward the compiled information. Additionally or alternatively, the agent_A 420 may passively provide access to the operations of application A 422. In response to an API request, the agent_A 420 may provide information relating to the current operation of the application A 422.

Whether actively compiling and providing information and/or passively providing information, the agent_A 420 may provide the information in a computer-readable form. For instance, the agent_A 420 may provide the information in JSON and/or in XML formats. The agent_A 420 may be accessible as a resource (e.g., in a representational state transfer (REST) environment) and/or as a service (e.g., in a simple object access protocol (SOAP) environment) (also referred to as a Web service). The information provided by the agent_A 420 may be raw information regarding the operation of the application A 422, compiled metrics (e.g., statistics, rates of events, etc.), combinations thereof, and/or other information regarding the operation of application A 422.

Configuring Monitoring Environments Using Agents

Figure 5:
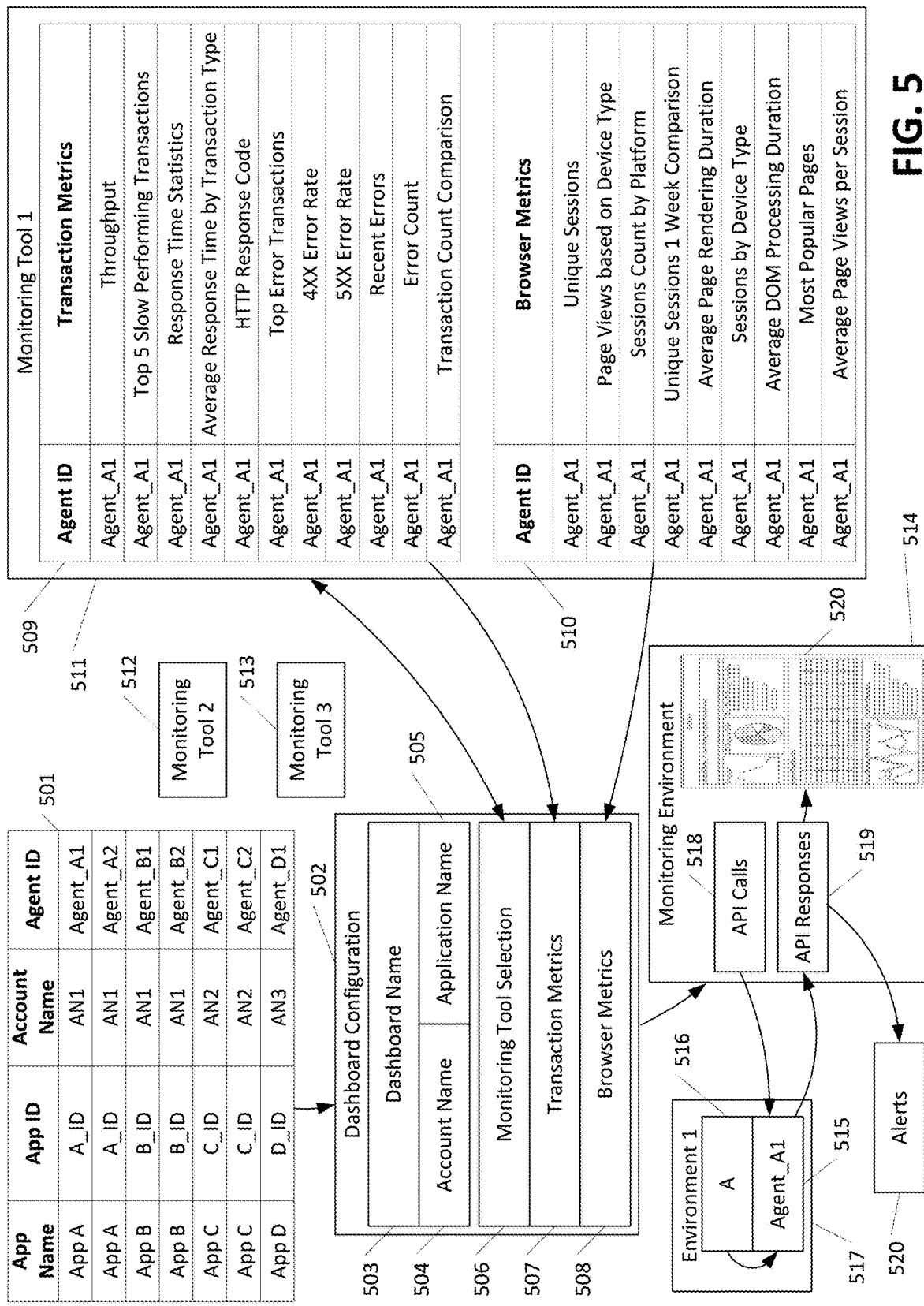
FIG. 5 depicts a user interface configured to receive selections for configuration of a monitoring dashboard.

FIG. 5 depicts a user interface configured to receive selections for configuration of a monitoring dashboard. FIG. 5 includes a dataset 501 that may include a variety of data relating an application name to an application ID, an account name, and/or an agent identification (also referred to as "agent ID"). FIG. 5 also includes a user interface 502 provided to a developer by which the developer may specify information relating to the dashboard and what the dashboard is intended to display leading to a given application. FIG. 5 may further comprise datasets 509-510 relating to information available from agents relating to transaction metrics (as transaction metrics dataset 509) and browser metrics (as browser metrics dataset 510).

A developer may receive a dashboard configuration user interface 502 from a processor. The dashboard configuration user interface 502 may comprise regions for receiving user selections/identifications of information pertinent to the generation of a monitoring dashboard. For instance, the dashboard configuration user interface 502 may comprise a dashboard name region 503, an account name region 504, an application name region 505, a monitoring tool selection region 506, a transaction metrics selection region 507, and/or a browser metrics selection region 508. A developer may enter a dashboard name in region 503 and enter an account name in region 504. The processor may receive the information from the developer, retrieve information relevant to the entered account name, and provide, for selection, available applications in the account. Additionally or alternatively, the developer may enter an application name and the processor modify the user interface 502 to reflect selectable account names available from dataset 501. Based on the developer's selections in the user interface 502, the processor may obtain, from dataset 501, the relevant agent for that application relating to the relevant account.

The user may select, via monitoring tool selection region 506, a monitoring tool from the list of monitoring tools 1-3 511-513, for instance. Additional or fewer monitoring tools may be made available for selection. Examples of monitoring tools 1-3 511-513 that support various monitoring of applications (e.g., via processing received payloads into useable information for display on a dashboard) may include the ELK Kibana dashboards from Elasticsearch B.V. (providing data in a JSON and Lucene formats) and the Splunk dashboards from Splunk Inc. (providing data in an XML format). Splunk and ELK Kibana are examples of log ingestion monitoring tools. Zabbix from Zabbix LLC, Amazon Web Services (AWS) Cloudwatch from Amazon Web Services, Inc., Datadog NK from Datadog, Inc. are examples of infrastructure monitoring tools. DataDog from DataDog, Inc., Gomez from Dynatrace, LLC., Apica from Apica AB, New Relic and New Relic One from New Relic Inc. are examples of application performance monitoring (APM) tools. Solarwinds and/or Centos from SolarWinds Worldwide, LLC. and Site 24/7 of Zoho Corp. are examples of network monitoring tools. Additional or fewer monitoring tools may be made available for selection as desired.

Based on the retrieved agent information and the monitoring tool selected in region 506, the user interface 502 may be modified to provide a list of selectable metrics. For example, monitoring tool 1 511 may provide both transaction metrics and browser metrics. It is appreciated that the types of metrics and related selection regions is related to those metrics provided by the monitoring tool or monitoring tools used to create The user may select one or more metrics as desired for incorporation into a dashboard. In the example of FIG. 5, the selectable metrics provided in region 507 may be obtained from the transaction metrics data 509 relating to those transaction metrics provided by the selected agent agent_A1. The selectable metrics provided in region 508 may be obtained from the browser metrics data 510 relating to those browser metrics provided by the selected agent agent_A1. The transaction metrics available through the selected agent may be found in dataset 508 that relates available agents to available transaction metrics for that monitoring tool 1 508. The browser metrics available through the selected agent may be found in dataset 509 that relates available agents to available transaction metrics for that monitoring tool 1 508.

Based on the developer's selections in user interface 502, a monitoring dashboard may be created, e.g., via one or more processors, conforming to the developer's selections. For instance, the selected metrics may be associated with software code that specifies one or more graphical and/or textual outputs for received information. The selected metrics may be instantiated in a monitoring environment 514 that displays metrics on a dashboard based on information from the selected agent. For example, based on the user selections made in dashboard configuration user interface 502, a processor may generate a combination of API call templates and a dashboard 520. The API call templates may be instantiated as API calls 518 to agent_A1 515. Agent_A1 515 receives information about application A 516 and, based on received API calls 518, agent_A1 515 sends, as payloads in the API responses 519, the information requested. For reference, both agent_A1 515 and application A 516 are shown as executing in environment 1 517. The payloads are receive in monitoring environment 514 and processed for display in the dashboard 520. For instance, software code to generate a graphical representation of an error count over time may comprise software code that sends, to the specific agent monitoring an application and via an API call, a request for a data stream relating to errors and when those errors occurred.

For instance, the selectable transaction metrics dataset 508 may relate agent IDs to various transaction metrics, where each of the selectable transaction metrics identifies an API call to that specific agent for that metric. The list of transaction metrics may comprise a variety of metrics, e.g., throughput metrics, top five slow performing transaction metrics, response time statistics metrics, average response time by transaction type metrics, HTTP response code metrics, top error transaction metrics, 4XX error rate metrics (e.g., three digit HTTP error codes starting with "4"), 5XX error rate metrics (e.g., three digit HTTP error codes starting with "5"), recent errors metrics, error count metrics, and transaction count comparison metrics. The selectable browser metrics dataset 510 may comprise a variety of metrics, e.g., unique sessions metrics, page views based on device type metrics, sessions count by platform metrics, unique sessions one-week comparison metrics, average page rendering duration metrics, sessions by device type metrics, average DOM (document object model) processing duration metrics, most popular pages metrics, and average page views per session metrics. It is appreciated that the number and type of selectable metrics is related to the selected monitoring tool 1-3 511-513 and the metric obtainable by the agent installed in the environment to monitor the application.

FIG. 5 may also include various types of alerts that may be associated with or independent from the generation of the dashboard 520. Similar to dashboarding, alerting may vary in complexity based on the available monitoring tools. For example, three types of alerts may be used. For reference, the alerts may be described as tier 0 alerts, tier 1 alerts, and tier 2 alerts. Tier 0 alerts may include alerts of the highest priority. When triggered, the application, network, and/or storage is in peril and the overall system is shut down until resolved. Tier 1 alerts may include alerts identifying a service degradation has been detected and one or more components need attention. Tier 2 alerts may include alerts that are still critical but redundancies for those components exist and are being temporarily used until the issue has been resolved. A greater or fewer quantity of alerts may be used as desired. Using the arrangement of FIG. 5, a monitoring tool may create and mute alerts descriptions based on the same process as selecting and creating the monitoring dashboard 520. The software developers and/or management teams may modify the monitoring environment 514 to customize when alerts are triggered and/or the information displayed on dashboard 520.

Figure 6:
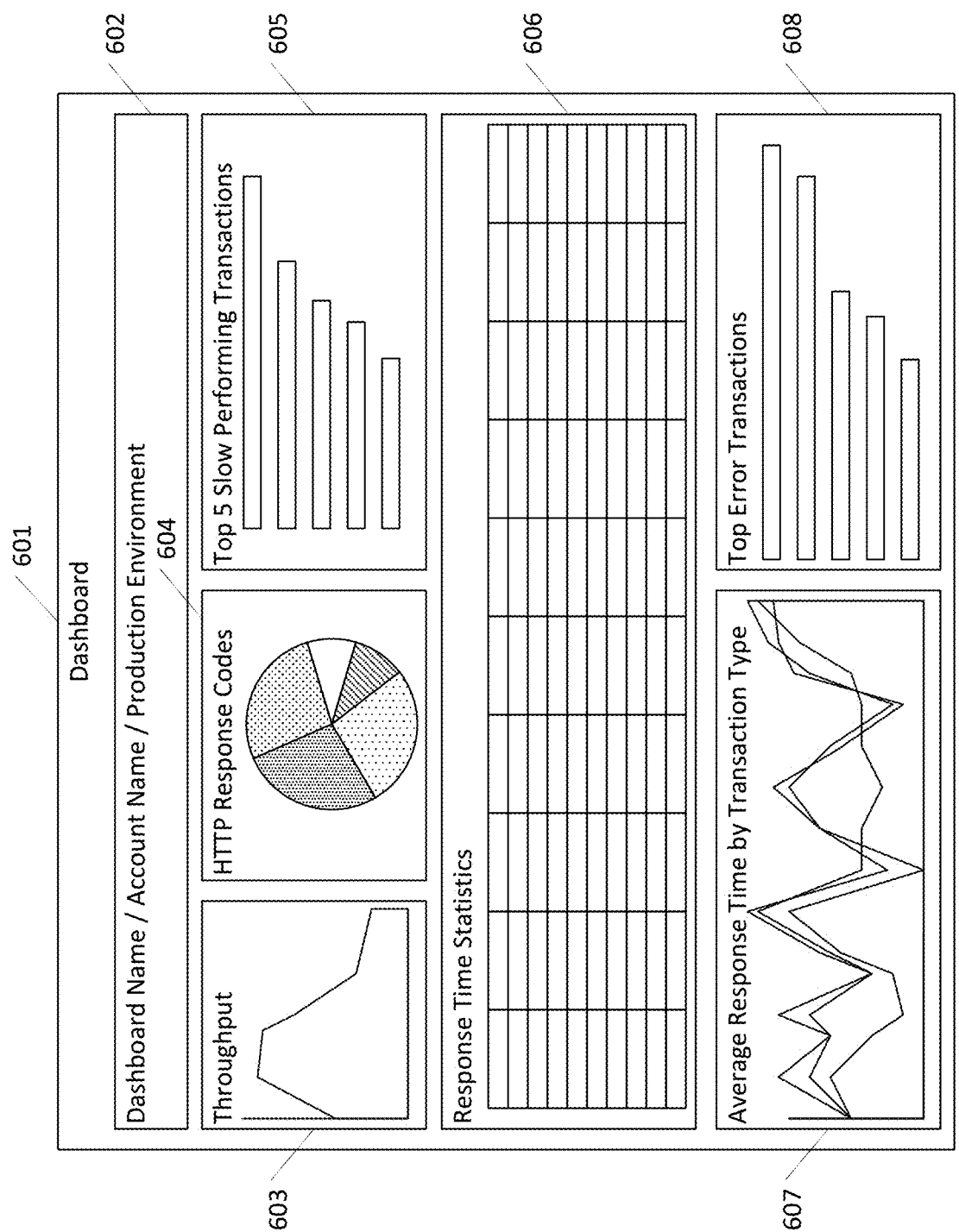
FIG. 6 depicts an example of a monitoring dashboard.

FIG. 6 depicts an example of a monitoring dashboard. A monitoring dashboard 601 may comprise information 602 relating to a dashboard name and/or account name and/or production environment. Graphical and/or textual regions may be generated to reflect metrics from a selected application with information received via a relevant agent. The regions may comprise, for instance, a throughput region 603, HTTP response codes region 604, top five slow performing transactions region 605, response time statistics region 606, average response time by transaction type region 607, and top error transactions region 608. The monitoring dashboard 601 may be modified to include a greater number of or fewer metrics as desired and as relating to the selected monitoring tool 1-3 511-513.

Figure 7:
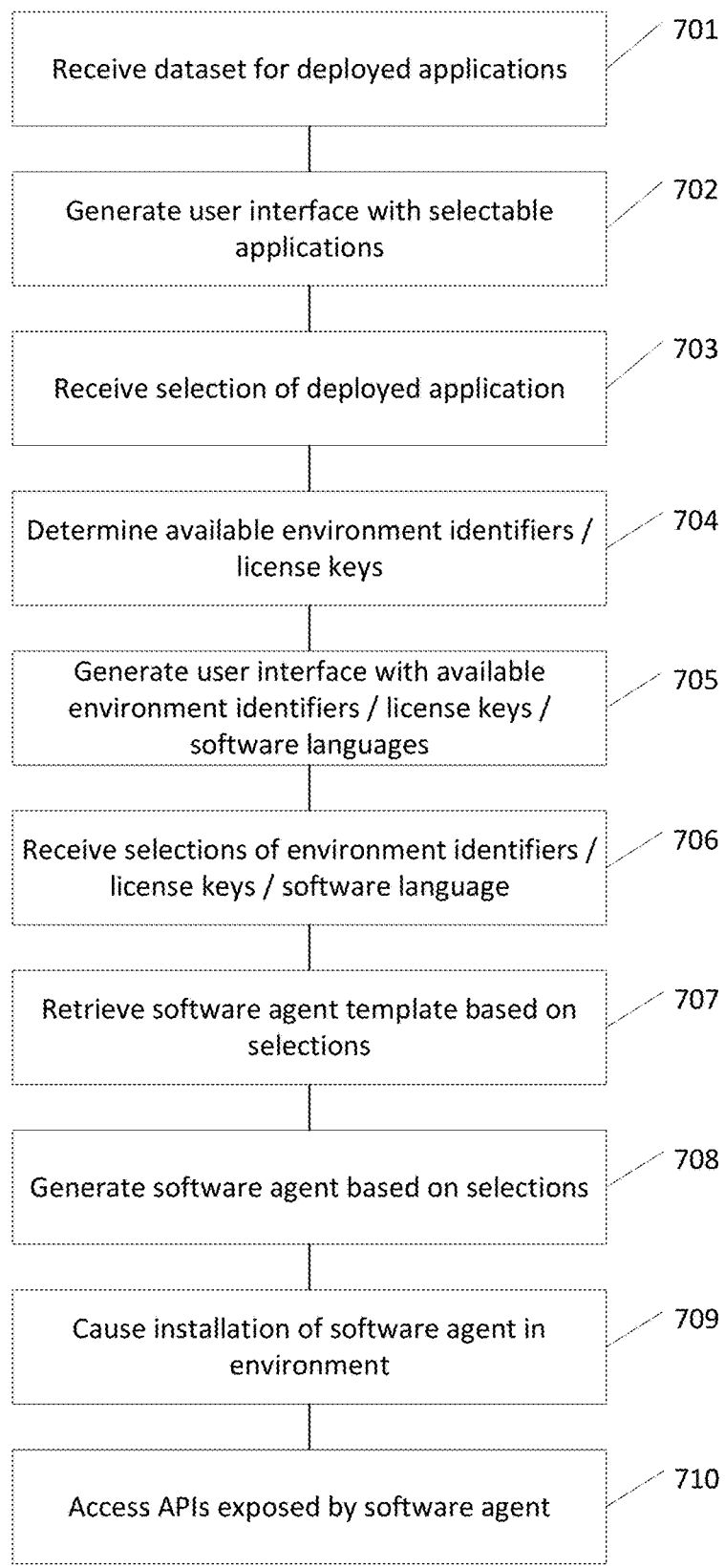
FIG. 7 depicts an example of a process for creating an agent to monitor an application.

FIG. 7 depicts an example of a process for creating an agent to monitor an application. In step 701, a dataset for deployed applications is received. In step 702, a user interface with selectable applications is generated for developer. In step 703, the user interface receives the developer's selection of the deployed application. In step 704, the system determines available environment identifiers/license keys for the deployed application. In step 705, a processor generates a user interface or updates the existing user interface with available environment identifiers/license keys/software languages relevant to the deployed application. In step 706, the user interface receives selections of the environment identifiers/lesions keys/software language for an agent. In step 707, a processor retrieves a software agent template based on one or more of the received selections from the developer. In step 708, a software agent is generated based on one or more of the selections. In step 709, the processor may cause installation of the software agent in the environment to monitor the relevant application (or cause the agent to remotely monitor the relevant application). In step 710, APIs exposed by the software agent may be accessible by one or more monitoring applications (e.g., one or more monitoring dashboards).

Figure 8:
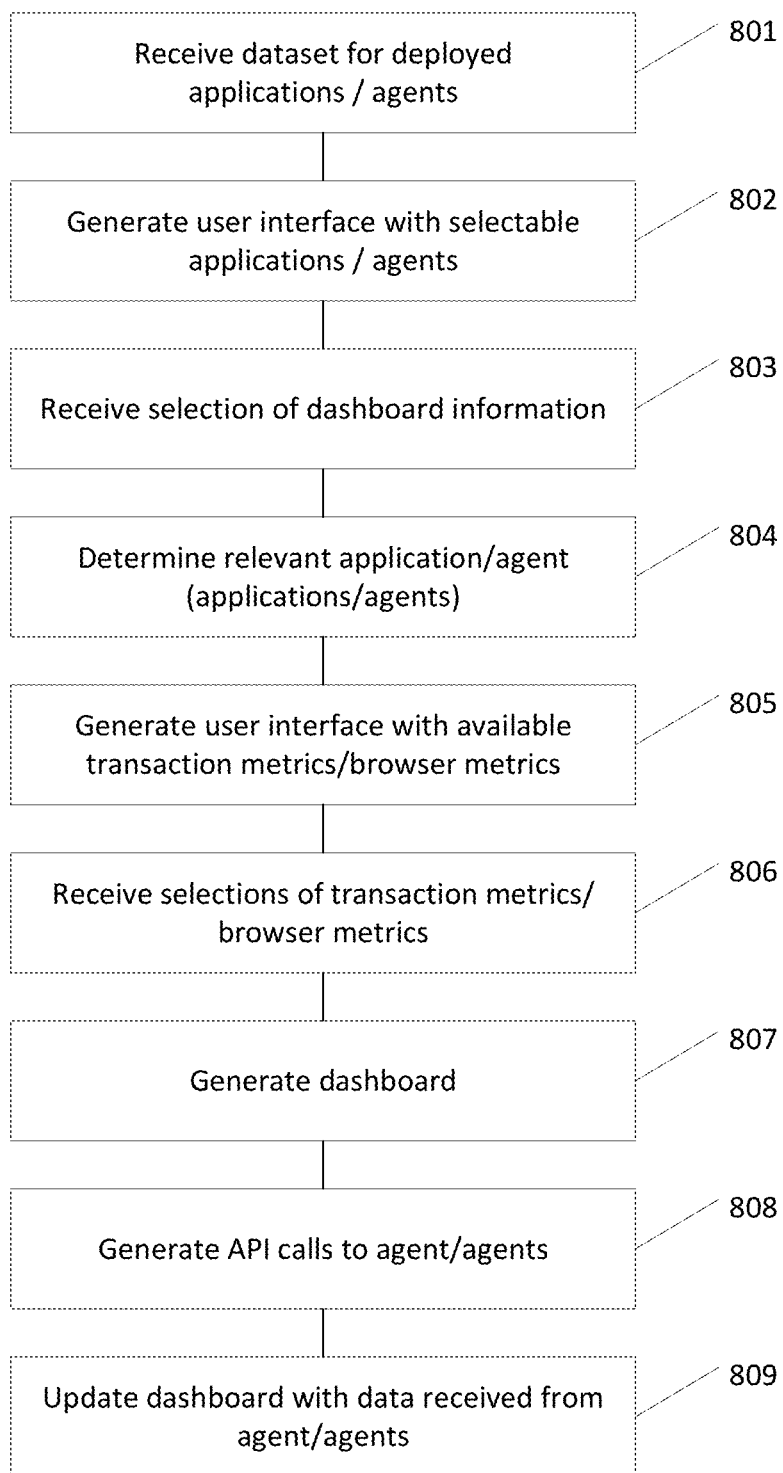
FIG. 8 depicts an example of a process for creating a dashboard using information from the agent to monitor the application.

FIG. 8 depicts an example of a process for creating a dashboard using information from the agent to monitor the deployed application. In step 801, one or more datasets for deployed applications and/or agents are received. In step 802, a user interface is generated in which the user interface contains selectable applications and/or available agents. In step 803, a processor receives a developer's selections made via the user interface from step 802. In step 804, a processor determines one or more relevant application and/or agents based on the selections from step 803. In step 805, the processor generates (and/or updates) a user interface with available transaction metrics/browser metrics relating to metrics available via the agent. In step 806, a processor receives the developer's selections made via the interface generated in step 805. Using the selected metrics, a dashboard is generated in step 807. In step 808, API calls to the specific agent/agents are generated. In step 809, information relating to the selected metrics are processed and displayed as updates to the dashboard.

Based on the above, a computer-implemented process may comprise receiving a dataset for deployed applications, wherein the dataset comprises application identifiers, production environment identifiers, and license keys, wherein the license keys are associated with combinations of the application identifiers and production environment identifiers. The method may further comprise generating a first user interface comprising a plurality of regions. The regions may comprise a first region configured to receive an application name associated with a deployed application of the deployed applications, a second region configured to receive a selection of production environment identifiers, a third region configured to receive a selection of license keys, and a fourth region configured to receive a language identification of a computer-readable language in which the deployed application was written. The method may further comprise receiving, via the first region, the application name; determining, from the dataset, an application identifier from the application identifiers corresponding to the application name; based on the application identifier, determining application identifier-specific production environment identifiers and application identifier-specific license keys associated with respective application identifier-specific production environment identifiers; modifying the first user interface to provide a list, in the second region, of the determined application identifier-specific production environment identifiers and to provide a list, in the third region, of the determined application identifier-specific license keys; and receiving, via the modified first user interface, a selected environment identifier via the second region, a selected license key via the third region, and the language identification via the fourth region. Based on the application identifier, the selected environment identifier, the selected license key, and the language identification, generating a software agent configured to facilitate monitoring the deployed application, wherein the software agent is configured to expose operations of the deployed application to be addressable, via an application programming interface (API), as metrics. The method may further comprise generating, based on the generated software agent and the metrics made available via the generated software agent, a second user interface comprising a sixth region configured to receive the application identifier and a seventh region configured to receive a selection of the metrics; and based on the application identifier received in the sixth region and the selection of one or more of the metrics, cause a monitoring application to monitor the selected service via the API.

Further, in some aspects, the monitoring application may comprise a dashboard user interface comprising graphical representations of operations of the metrics. The method may further comprise receiving an operating system identification. The software agent may be generated based on the language identification associated with the deployed application and based on the operating system identification and retrieving a software agent template configured to monitor where the template is written to be used in the identified operating system. The agent may be generated based on the software agent template, the application name, the selected environment identifier, and the selected license key. The software agent may be generated contact information received via the first user interface.

The metrics may comprise one or more metrics that may include response-related statistics such as throughput statistics; response time statistics; slow performing transaction statistics; average response times per transaction type statistics; transaction count comparison statistics; or a combination of one or more of the throughput statistics, response time statistics, the slow performing transaction statistics, the average response times per transaction type statistics, and the transaction count comparison statistics. Additionally or alternatively, the metrics may comprise metrics that include error-related statistics comprising error code statistics; recent error code statistics; error codes by code type statistics; error counts statistics; or a combination of one or more of the error code statistics, the recent error code statistics, the error codes by error code type statistics, and the error counts statistics. The metrics may further comprise access-related statistics comprising unique session statistics; page views based on device type statistics; session counts per platform statistics; unique sessions per time window statistics; average page rendering duration statistics; sessions by device type statistics; average document object model (DOM) processing duration statistics; page popularity statistics; average page views per session statistics; or a combination of one or more of the unique session statistics, the page views based on device type statistics, the session counts per platform statistics, the unique sessions per time window statistics, the average page rendering duration statistics, the sessions by device type statistics, the average document object model (DOM) processing duration statistics, the page popularity statistics, and the average page views per session statistics.

The method may further comprise receiving, for the deployed application, a deployment environment identification identifying the deployment environment as a production environment or a non-production environment and the agent is based on the received deployment environment identification. The software agent may be deployed to monitor the deployed application. The user interfaces may be modified based on selections made in the user interface, e.g., to include additional regions and/or metrics. The method may further comprise receiving an operating system identification associated with an operating system of the deployed application; and receiving operating system-specific instructions for generating the software agent. The generation of the software agent may be based on the received operating system-specific instructions.

The apparatus may comprise one or more processors with instructions that cause the processors to receive a dataset for deployed applications, where the dataset may comprise application identifiers, production environment identifiers, and license keys. The license keys may be associated with combinations of the application identifiers and production environment identifiers. The instructions may further cause the apparatus to generate, based on the received dataset, a first user interface comprising a first region configured to receive an application name associated with a deployed application of the deployed applications, a second region configured to receive a selection of production environment identifiers, a third region configured to receive a selection of license keys, a fourth region configured to receive a language identification of a computer-readable language in which the deployed application was written, and a fifth region configured to receive an operating system identification identifying an operating system in which the deployed application executes.

The instructions may cause the apparatus to receive, via the first region, the application name; determine, from the dataset, an application identifier from the application identifiers corresponding to the application name; based on the application identifier, determine application identifier-specific production environment identifiers and application identifier-specific license keys associated with respective application identifier-specific production environment identifiers; and modify the first user interface to provide a list, in the second region, of the determined application identifier-specific production environment identifiers and to provide a list, in the third region, of the determined application identifier-specific license keys. The instructions may further cause the apparatus to receive, via the modified first user interface, a selected environment identifier via the second region, a selected license key via the third region, the language identification via the fourth region, and the operating system identification via the fifth region and, based on the application identifier, the selected environment identifier, the selected license key, the language identification, and the operating system identification, generate a software agent configured to facilitate monitoring the deployed application. The software agent may be configured to expose operations of the deployed application to be addressable, via an application programming interface (API), as metrics.

The instructions may further cause the apparatus to generate, based on the generated software agent and the metrics made available via the generated software agent, a second user interface comprising a sixth region configured to receive the application identifier and a seventh region configured to receive a selection of the metrics and, based on the application identifier received in the sixth region and the selection of one or more of the metrics, cause a monitoring application to monitor the selected service via the API.

In some examples, the generated second user interface is a dashboard comprising graphical representations of operations of the metrics. In some examples, the metrics may comprise throughput statistics; response time statistics; slow performing transaction statistics; average response times per transaction type statistics; transaction count comparison statistics; or a combination of one or more of the throughput statistics, response time statistics, the slow performing transaction statistics, the average response times per transaction type statistics, and the transaction count comparison statistics. In additional or alternative examples, the metrics comprise error code statistics; recent error code statistics; error codes by code type statistics; error counts statistics; or a combination of one or more of the error code statistics, the recent error code statistics, the error codes by error code type statistics, and the error counts statistics. In additional or alternative examples, the metrics comprise unique session statistics; page views based on device type statistics; session counts per platform statistics; unique sessions per time window statistics; average page rendering duration statistics; sessions by device type statistics; average document object model (DOM) processing duration statistics; page popularity statistics; average page views per session statistics; or a combination of one or more of the unique session statistics, the page views based on device type statistics, the session counts per platform statistics, the unique sessions per time window statistics, the average page rendering duration statistics, the sessions by device type statistics, the average document object model (DOM) processing duration statistics, the page popularity statistics, and the average page views per session statistics.

The instructions may further cause the apparatus to receive, for the deployed application, a deployment environment identification identifying the deployment environment as a production environment or a non-production environment, wherein generation of the software agent is further based on the received deployment environment identification.

Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

A non-transitory media may store instructions that, when executed by a processor, cause the processor to perform functions comprising receiving a dataset for deployed applications, wherein the dataset comprises application identifiers, production environment identifiers, and license keys, wherein the license keys are associated with combinations of the application identifiers and production environment identifiers. The instructions may further cause the processor to perform functions including generating, based on the received dataset, a first user interface comprising a plurality of regions. The first user interface may comprise a first region configured to receive an application name associated with a deployed application of the deployed applications, a second region configured to receive a selection of production environment identifiers, a third region configured to receive a selection of license keys, and a fourth region configured to receive a language identification of a computer-readable language in which the deployed application was written. The instructions may further cause the processor to perform functions including receiving, via the first region, the application name; determining, from the dataset, an application identifier from the application identifiers corresponding to the application name; based on the application identifier, determining application identifier-specific production environment identifiers and application identifier-specific license keys associated with respective application identifier-specific production environment identifiers; modifying the first user interface to provide a list, in the second region, of the determined application identifier-specific production environment identifiers and to provide a list, in the third region, of the determined application identifier-specific license keys; and receiving, via the modified first user interface, a selected environment identifier via the second region, a selected license key via the third region, and the language identification via the fourth region. Based on the application identifier, the selected environment identifier, the selected license key, and the language identification, the instructions may further cause the processor to perform functions including generating a software agent configured to facilitate monitoring the deployed application, wherein the software agent is configured to expose operations of the deployed application to be addressable, via an application programming interface (API), as metrics; generating, based on the generated software agent and the metrics made available via the generated software agent, a second user interface comprising a sixth region configured to receive the application identifier and a seventh region configured to receive a selection of the metrics; and based on the application identifier received in the sixth region and the selection of one or more of the metrics, cause a monitoring application to monitor the selected service via the API. In one or more examples, the generated second user interface may include a dashboard comprising graphical representations of operations of the metrics. Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving a dataset for deployed applications, wherein the dataset comprises application identifiers, production environment identifiers, and license keys, wherein the license keys are associated with combinations of the application identifiers and production environment identifiers;
generating, based on the received dataset, a first user interface comprising a plurality of regions comprising:
a first region configured to receive an application name associated with a deployed application of the deployed applications,
a second region configured to receive a selection of production environment identifiers,
a third region configured to receive a selection of license keys, and
a fourth region configured to receive a language identification of a computer-readable language in which the deployed application was written; and
receiving, via the first region, the application name;
determining, from the dataset, an application identifier from the application identifiers corresponding to the application name;
based on the application identifier, determining application identifier-specific production environment identifiers and application identifier-specific license keys associated with respective application identifier-specific production environment identifiers;
modifying the first user interface to provide a list, in the second region, of the determined application identifier-specific production environment identifiers and to provide a list, in the third region, of the determined application identifier-specific license keys;
receiving, via the modified first user interface, a selected environment identifier via the second region, a selected license key via the third region, and the language identification via the fourth region;
based on the application identifier, the selected environment identifier, the selected license key, and the language identification, generating a software agent configured to expose operations of the deployed application to be addressable, via an application programming interface (API), as metrics;
generating, based on the generated software agent and the metrics made available via the generated software agent, a second user interface comprising a sixth region configured to receive the application identifier and a seventh region configured to receive a selection of the metrics; and
based on the application identifier received in the sixth region and the selection of one or more of the metrics, cause a monitoring application to monitor the deployed application via the API.

2. The computer-implemented method of claim 1, wherein the monitoring application comprises a dashboard user interface comprising graphical representations of operations of the metrics.

3. The computer-implemented method of claim 1, further comprising:
receiving an operating system identification,
wherein generating the software agent comprises:
based on the language identification associated with the deployed application and based on the operating system identification, retrieving a software agent template configured to monitor, in the identified operating system, the deployed application written in the identified language; and
based on the software agent template, the application name, the selected environment identifier, and the selected license key, generating the software agent.

4. The computer-implemented method of claim 3, wherein generating the software agent is further based on contact information received via the first user interface.

5. The computer-implemented method of claim 1, wherein the metrics comprise one or more of:
throughput statistics;
response time statistics;
slow performing transaction statistics;
average response times per transaction type statistics;
transaction count comparison statistics; or
a combination of one or more of the throughput statistics, response time statistics, the slow performing transaction statistics, the average response times per transaction type statistics, or the transaction count comparison statistics.

6. The computer-implemented method of claim 1, wherein the metrics comprise one or more of:
error code statistics;
recent error code statistics;
error codes by code type statistics;
error counts statistics; or
a combination of one or more of the error code statistics, the recent error code statistics, the error codes by error code type statistics, or the error counts statistics.

7. The computer-implemented method of claim 1, wherein the metrics comprise one or more of:
unique session statistics;
page views based on device type statistics;
session counts per platform statistics;
unique sessions per time window statistics;
average page rendering duration statistics;
sessions by device type statistics;
average document object model (DOM) processing duration statistics;
page popularity statistics;
average page views per session statistics; or
a combination of one or more of the unique session statistics, the page views based on device type statistics, the session counts per platform statistics, the unique sessions per time window statistics, the average page rendering duration statistics, the sessions by device type statistics, the average document object model (DOM) processing duration statistics, the page popularity statistics, or the average page views per session statistics.

8. The method of claim 1, further comprising:
receiving, for the deployed application, a deployment environment identification identifying the deployment environment as a production environment or a non-production environment;
wherein generating the software agent is further based on the received deployment environment identification.

9. The method of claim 1, further comprising:
deploying the software agent to monitor the deployed application.

10. The method of claim 1, further comprising:
receiving user modifications to the second user interface; and
generating, based on the user modifications, a modified second user interface.

11. The method of claim 10,
wherein the modified second user interface comprises additional regions.

12. The method of claim 10,
wherein the modified second user interface comprises additional metrics.

13. The method of claim 1, further comprising:
receiving an operating system identification associated with an operating system of the deployed application; and
receiving operating system-specific instructions for generating the software agent,
wherein generating the software agent is further based on the received operating system-specific instructions.

14. An apparatus comprising:
one or more processors; and
memory storing instructions that, when executed by the one or more processors, cause the apparatus to:
receive a dataset for deployed applications, wherein the dataset comprises application identifiers, production environment identifiers, and license keys, wherein the license keys are associated with combinations of the application identifiers and production environment identifiers;
generate, based on the received dataset, a first user interface comprising a plurality of regions comprising:
a first region configured to receive an application name associated with a deployed application of the deployed applications,
a second region configured to receive a selection of production environment identifiers,
a third region configured to receive a selection of license keys,
a fourth region configured to receive a language identification of a computer-readable language in which the deployed application was written, and
a fifth region configured to receive an operating system identification identifying an operating system in which the deployed application executes; and
receive, via the first region, the application name;
determine, from the dataset, an application identifier from the application identifiers corresponding to the application name;
based on the application identifier, determine application identifier-specific production environment identifiers and application identifier-specific license keys associated with respective application identifier-specific production environment identifiers;
modify the first user interface to provide a list, in the second region, of the determined application identifier-specific environment identifiers and to provide a list, in the third region, of the determined application identifier-specific license keys;
receive, via the modified first user interface, a selected environment identifier via the second region, a selected license key via the third region, the language identification via the fourth region, and the operating system identification via the fifth region;

based on the application identifier, the selected environment identifier, the selected license key, the language identification, and the operating system identification, generate a software agent configured to facilitate monitoring the deployed application, wherein the software agent is configured to expose operations of the deployed application to be addressable, via an application programming interface (API), as metrics;

generate, based on the generated software agent and the metrics made available via the generated software agent, a second user interface comprising a sixth region configured to receive the application identifier and a seventh region configured to receive a selection of the metrics; and based on the application identifier received in the sixth region and the selection of one or more of the metrics, cause a monitoring application to monitor the deployed application via the API.

15. The apparatus of claim 14, wherein the generated second user interface is a dashboard comprising graphical representations of operations of the metrics.

16. The apparatus of claim 14, wherein the metrics comprise one or more of:
 throughput statistics;
 response time statistics;
 slow performing transaction statistics;
 average response times per transaction type statistics;
 transaction count comparison statistics; or
 a combination of one or more of the throughput statistics, response time statistics, the slow performing transaction statistics, the average response times per transaction type statistics, or the transaction count comparison statistics.

17. The apparatus of claim 14, wherein the metrics comprise one or more of:
 error code statistics;
 recent error code statistics;
 error codes by code type statistics;
 error counts statistics; or
 a combination of one or more of the error code statistics, the recent error code statistics, the error codes by error code type statistics, or the error counts statistics.

18. The apparatus of claim 14, wherein the metrics comprise one or more of:
 unique session statistics;
 page views based on device type statistics;
 session counts per platform statistics;
 unique sessions per time window statistics;
 average page rendering duration statistics;
 sessions by device type statistics;
 average document object model (DOM) processing duration statistics;
 page popularity statistics;
 average page views per session statistics; or
 a combination of one or more of the unique session statistics, the page views based on device type statistics, the session counts per platform statistics, the unique sessions per time window statistics, the average page rendering duration statistics, the sessions by device type statistics, the average document object model (DOM) processing duration statistics, the page popularity statistics, or the average page views per session statistics.

19. The apparatus of claim 14, wherein the instructions further cause the apparatus to:
 receive, for the deployed application, a deployment environment identification identifying the deployment environment as a production environment or a non-production environment,
 wherein generation of the software agent is further based on the received deployment environment identification.

20. One or more non-transitory media storing instructions that, when executed by one or more processors, cause the one or more processors to perform steps comprising:
 receiving a dataset for deployed applications, wherein the dataset comprises application identifiers, production environment identifiers, and license keys, wherein the license keys are associated with combinations of the application identifiers and production environment identifiers;
 generating, based on the received dataset, a first user interface comprising a plurality of regions comprising:
  a first region configured to receive an application name associated with a deployed application of the deployed applications,
  a second region configured to receive a selection of production environment identifiers,
  a third region configured to receive a selection of license keys, and
  a fourth region configured to receive a language identification of a computer-readable language in which the deployed application was written; and
 receiving, via the first region, the application name;
 determining, from the dataset, an application identifier from the application identifiers corresponding to the application name;
 based on the application identifier, determining application identifier-specific production environment identifiers and application identifier-specific license keys associated with respective application identifier-specific production environment identifiers;
 modifying the first user interface to provide a list, in the second region, of the application identifier-specific environment identifiers and to provide a list, in the third region, of the determined application identifier-specific license keys;
 receiving, via the modified first user interface, a selected environment identifier via the second region, a selected license key via the third region, and the language identification via the fourth region;
 based on the application identifier, the selected environment identifier, the selected license key, and the language identification, generating a software agent configured to facilitate monitoring the deployed application, wherein the software agent is configured to expose operations of the deployed application to be addressable, via an application programming interface (API), as metrics;
 generating, based on the generated software agent and the metrics made available via the generated software agent, a second user interface comprising a sixth region configured to receive the application identifier and a seventh region configured to receive a selection of the metrics; and
 based on the application identifier received in the sixth region and the selection of one or more of the metrics, cause a monitoring application to monitor the deployed application via the API, wherein the generated second user interface is a dashboard comprising graphical representations of operations of the metrics.

\* \* \* \* \*